United States Patent
Maier

(10) Patent No.: US 9,206,819 B2
(45) Date of Patent: Dec. 8, 2015

(54) SUBSEA MOTOR-COMPRESSOR COOLING SYSTEM

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 325 days.

(21) Appl. No.: 13/477,254

(22) Filed: May 22, 2012

(65) Prior Publication Data

US 2013/0136629 A1 May 30, 2013

Related U.S. Application Data

(60) Provisional application No. 61/491,977, filed on Jun. 1, 2011.

(51) Int. Cl.

| | |
|---|---|
| *F04D 29/58* | (2006.01) |
| *F04D 17/12* | (2006.01) |
| *F04D 25/06* | (2006.01) |
| *F04D 29/00* | (2006.01) |
| *F28F 9/00* | (2006.01) |
| *H02K 9/12* | (2006.01) |
| *H02K 5/132* | (2006.01) |
| *H02K 7/14* | (2006.01) |

(52) U.S. Cl.
CPC .......... *F04D 29/5826* (2013.01); *F04D 17/122* (2013.01); *F04D 25/0686* (2013.01); *F04D 29/00* (2013.01); *F04D 29/584* (2013.01); *F28F 9/00* (2013.01); *H02K 9/12* (2013.01); *H02K 5/132* (2013.01); *H02K 7/14* (2013.01)

(58) Field of Classification Search
CPC ... F04D 17/122; F04D 29/041; F04D 29/056; F04D 29/582; F04D 29/5826; F04D 29/584; F04D 25/086; F04D 29/58336

USPC ......... 417/366, 367, 373, 313, 423.13, 423.3, 417/423.8; 310/52–55, 56–59
See application file for complete search history.

(56) References Cited

U.S. PATENT DOCUMENTS

| | | | | |
|---|---|---|---|---|
| 2,787,720 | A * | 4/1957 | Ethier et al. | 310/57 |
| 2002/0028145 | A1* | 3/2002 | Samurin | 417/313 |
| 2006/0242969 | A1* | 11/2006 | Minton et al. | 62/50.2 |
| 2008/0107547 | A1* | 5/2008 | Kaminski et al. | 417/366 |
| 2009/0151928 | A1* | 6/2009 | Lawson | 166/105.5 |
| 2010/0014990 | A1* | 1/2010 | Nijhuis | 417/53 |
| 2011/0017307 | A1* | 1/2011 | Kidd et al. | 137/1 |
| 2011/0068644 | A1* | 3/2011 | Kamp | 310/53 |

FOREIGN PATENT DOCUMENTS

WO   WO2007043889   *   4/2007   ............. E21B 43/12

* cited by examiner

*Primary Examiner* — Charles Freay
*Assistant Examiner* — Kenneth J Hansen
(74) *Attorney, Agent, or Firm* — Edmonds & Nolte, PC

(57) ABSTRACT

A fluid compression system is disclosed having a hermetically-sealed housing with at least a motor and a compressor arranged therein. The motor may drive both the compressor and a blower configured to circulate a cooling gas throughout the housing and thereby cool the motor and accompanying radial bearings. The cooling gas may be cooled in a gas-to-gas heat exchanger fluidly coupled to the blower and configured to receive a flow of process gas to cool the cooling gas. The process gas may be the suction process gas for the compressor, or the compressed process gas as discharged from the compressor.

11 Claims, 4 Drawing Sheets

SUBSEA MOTOR-COMPRESSOR COOLING SYSTEM

This application claims priority to U.S. Patent Application Ser. No. 61/491,977, which was filed Jun. 1, 2011. The priority application is hereby incorporated by reference in its entirety into the present application.

BACKGROUND

A motor may be combined with a compressor, such as a centrifugal compressor, in a single housing to provide what is known as a motor-compressor device. Motor-compressors are often used in subsea environments in the production or transport of hydrocarbons. Via a shared rotating shaft supported by a rotor-bearing system, the motor drives/rotates the compressor in order to generate a flow of compressed process gas. As the motor drives the compressor, heat is generated by the electrical systems that are characteristic of electric motor drivers. Heat is also generated through the windage friction resulting from the rotating components operating in pressurized gas. If this heat is not properly managed, it adversely affects the performance of the motor and can damage the insulation of the stator. Increased temperatures can also adversely affect the rotor-bearing systems of both the compressor and motor, thus leading to bearing damage and/or failure.

One common method of cooling the motor and bearings in a subsea motor-compressor is to use an open-loop cooling circuit where gas is drawn from the process stream at some point in the compression process. This gas is then passed through the motor and bearing areas to absorb heat, and subsequently directed back to the suction inlet of the compressor. The benefits of these systems include low part count and some protection against hydrate formation throughout the cooling circuit. These systems typically do not have active temperature control for the cooling loop due to reliability concerns, and therefore must float the temperature of the cooling loop on the heat input from the motor and the heat rejection to the cooling gas. The lower limit on cooling loop temperature for open-loop systems is simply the process gas side stream temperature. The cooling loop cannot go below this temperature, which is normally above hydrate formation values.

Unfortunately, along with these benefits there are two significant problems with the open-loop cooling circuit approach to subsea motor-compressor cooling. The first is long term contamination of the motor and bearing areas. To limit the amount of debris circulated through the cooling loop, some form of filter or separation device must be used. However, even with very good filtration of the gas, a certain amount of debris inevitably passes into the cooling circuit. This debris tends to drop out at low velocity areas of the cooling circuit, and over time, with continual accumulation of debris, significant degradation in cooling effectiveness occurs. The second problem is with the filter/conditioning device, which not only adds complexity, size, and cost to the subsea module, but also has material build-up and plugging issues as well. The filter/conditioning device either has to have lower separation performance, such as with a cyclonic separator, which leads to quicker fouling of the motor and bearings, or it must be a high-performance filtration device, which requires periodic cleaning, flushing, or other servicing, each of which are expensive and problematic in a subsea setting.

Another method of cooling the motor and bearings in a subsea motor-compressor is to use a semi-closed loop cooling circuit. In the semi-closed loop cooling systems, the cooling circuit is generally isolated by a shaft seal that limits fluid communication with the process stream, and thus has a smaller chance of accumulating contaminating material. Only a small amount of process gas (typically less than 1% of the main gas flow) is fed into the cooling circuit from the process stream to make-up for seal leakage. The semi-closed loop system often uses a small blower to circulate the cooling gas through the cooling circuit. In subsea applications, the cooling gas is typically cooled in a sea water-cooled heat exchanger.

Although the semi-closed loop cooling system minimizes debris build-up in the cooling circuit, it has its own shortcomings as well. Using a sea water-cooled heat exchanger to cool the cooling gas introduces a significant risk of hydrate formation in the cooling circuit. This is especially true for a floating temperature control scheme tied to the sea water-cooled heat exchanger and while running at low load conditions. As a result, the cooling gas can actually approach the temperature of the sea water because of its thermal contact in the heat exchanger.

There is a need, therefore, for an improved, compact, and more robust cooling system for a subsea motor-compressor arrangement that will not be susceptible to the drawbacks of the prior systems described above.

SUMMARY

Embodiments of the disclosure may provide a fluid compression system. The system may include a hermetically-sealed housing having a rotatable shaft arranged therein, the housing defining a plurality of internal cooling passages and the rotatable shaft having a motor rotor section and a driven section, wherein the motor rotor section is adapted to rotate the driven section. The system may further include a motor arranged within the housing, coupled to the motor rotor section of the rotatable shaft, and in fluid communication with at least one of the plurality of internal cooling passages, and a compressor arranged within the housing and axially-spaced from the motor, the compressor being coupled to the driven section of the shaft and configured to receive and compress a process gas. The system may also include one or more radial bearings arranged along the rotatable shaft and configured to support the motor rotor and driven sections, each radial bearing is in fluid communication with at least one of the plurality of internal cooling passages, and a blower arranged within the housing and coupled to a free end of the rotatable shaft, the blower being configured to circulate a cooling gas through the plurality of internal cooling passages to regulate the temperature of the motor and the one or more radial bearings. The system may further include a gas-to-gas heat exchanger fluidly coupled to the blower and configured to receive a flow of the process gas to reduce the temperature of the cooling gas.

Embodiments of the disclosure may further provide a cooling circuit for a motor-compressor. The cooling circuit may include internal cooling passages defined within a hermetically-sealed housing having a rotatable shaft arranged therein, the rotatable shaft being supported by a plurality of radial bearings in fluid communication with at least one internal cooling passage, and a blower in fluid communication with the internal cooling passages and arranged within the housing, the blower being coupled to the rotatable shaft for rotation therewith and configured to circulate a cooling gas through the plurality of internal cooling passages. The cooling circuit may further include a gas-to-gas heat exchanger in fluid communication with the blower and configured to receive a flow of process gas to reduce the temperature of the cooling gas.

Embodiments of the disclosure may further provide a method for cooling a fluid compression system. The method may include supporting a rotatable shaft within a hermetically-sealed housing with radial bearings, the radial bearings being in fluid communication with internal cooling passages defined within the housing, and circulating a cooling gas through the internal cooling passages with a blower coupled to a free end of the rotatable shaft. The method may also include cooling a motor arranged within the housing and the radial bearings with the cooling gas, and circulating the cooling gas through a gas-to-gas heat exchanger in fluid communication with the blower. The method may further include receiving a flow of process gas in the gas-to-gas heat exchanger, and cooling the cooling gas in the gas-to-gas heat exchanger with the flow of process gas.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
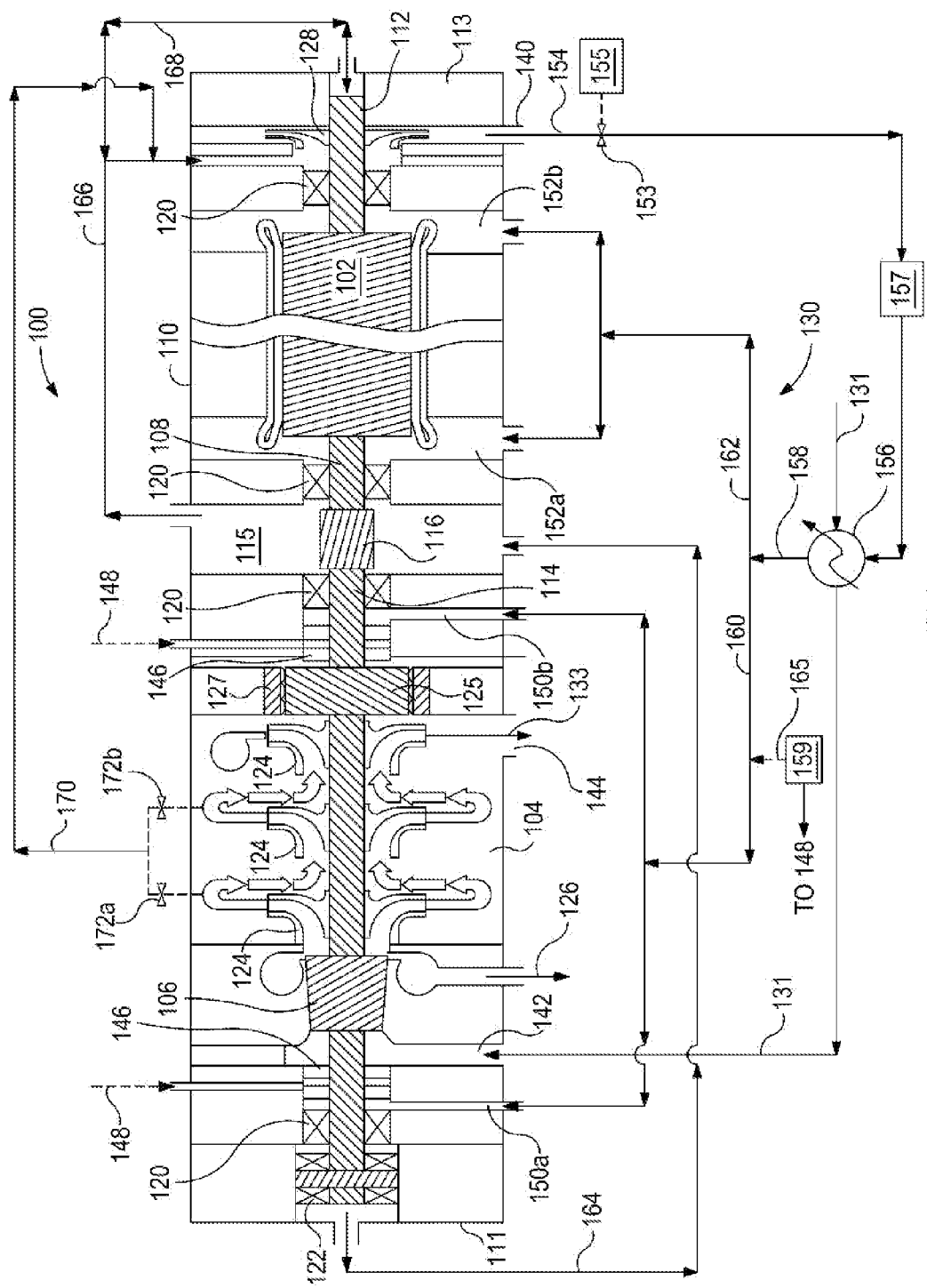
FIG. 1 illustrates an exemplary fluid compression system and cooling circuit, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary fluid compression system 100, according to embodiments described herein. In at least one embodiment, the fluid compression system 100 may be used in subsea fluid compression applications for the recovery and/or processing of hydrocarbons. It will be appreciated, however, that the system 100 may be equally applicable in land-based applications, without departing from the scope of the disclosure.

The system 100 includes a motor 102 coupled to a compressor 104 via a rotatable shaft 108. Accordingly, the system 100 may be characterized generally as a motor-compressor device. The motor 102 may also be coupled to an integrated separator 106 via the rotatable shaft 108, whereby the compressor 104 and separator 106 form an integrated separator/compressor assembly. In other embodiments, however, the integrated separator 106 may be omitted from the system 100 so that the motor 102 only drives the compressor 104. In yet other embodiments, the compressor 104 may be replaced with a pump or the like, without departing from the scope of the disclosure.

The motor 102, compressor 104, and integrated separator 106 may each be positioned within a housing 110 having a first end, or compressor end 111, and a second end, or motor end 113. The housing 110 may hermetically-seal the motor 102, compressor 104, and integrated separator 106 within, thereby providing both support for each component and isolation from the external environment. The motor 102 may be an electric motor, such as a permanent magnet motor. Other embodiments, however, may employ other types of electric motors 102 such as, but not limited to, synchronous, induction, brushed DC motors, etc.

The rotatable shaft 108 extends substantially the whole length of the housing 110 and includes a motor rotor section 112 and a driven section 114. The motor rotor section 112 is coupled to or otherwise forms part of the motor 102, and the driven section 114 is coupled to or otherwise forms part of the compressor 104 (and/or separator 106, if present) and driven by the motor rotor section 112. In one embodiment, the driven section 114 is connected to the motor rotor section 112 via a coupling 116, such as a flexible or a rigid coupling. In other embodiments, the rotatable shaft 108, including the rotor and driven sections 112, 114, may be a single, integral shaft. The coupling 116 (if used) may be generally arranged within a cavity 115 defined within the housing 110.

The motor rotor section 112 and driven section 114 of the shaft 108 may be supported at each end, respectively, by one or more radial bearings 120. The radial bearings 120 may be directly or indirectly supported by the housing 110, and in turn provide support to the motor rotor and driven sections 112, 114. In one embodiment, the bearings 120 may be magnetic bearings, such as active or passive magnetic bearings. In other embodiments, however, other types of bearings 120 may be used, without departing from the scope of the disclosure. In addition, at least one axial thrust bearing 122 may be provided at or near the end of the shaft 108 adjacent the compressor end 111 of the housing 110. The axial thrust bearing 122 may be a magnetic bearing configured to bear axial thrusts generated by the compressor 104.

The compressor 104 may be a multi-stage centrifugal compressor with one or more (in the illustrated case, three) compressor stage impellers 124. As can be appreciated, however, any number of impellers 124 may be used without departing from the scope of the disclosure. Moreover, while a straight-through compressor 104 is illustrated, embodiments are also contemplated where the compressor 104 is a back-to-back compressor. The integrated separator 106 may be configured to separate and remove higher-density components from lower-density components contained within a process gas 131 introduced into the system 100. The higher-density components (i.e., liquids, solids, or relatively dense gases) removed from the process gas 131 may be discharged via a discharge line 126, thereby providing a relatively dry process gas to be introduced into the compressor 104. Especially in subsea applications where the process gas 131 is commonly multiphase, any separated liquids discharged via line 126 may accumulate in a collection vessel (not shown) and be subsequently pumped back into the process gas at a pipeline location downstream of the compressor 104.

A balance piston 125, including an accompanying balance piston seal 127, may be arranged on the shaft 108 between the motor 102 and the compressor 104. Any compressor 104 thrust not absorbed by the balance piston 125 may be otherwise absorbed by the thrust bearing(s) 122.

The system 100 may further include a blower 128 coupled at or near a free end of the shaft 108, such as at the end of the motor rotor section 112, as illustrated. Since the blower 128 is coupled to the shaft 108, rotation of the shaft 108 will also drive the blower 128. In another embodiment, the shaft 108 may extend outside the housing 110 and the blower 128 may be arranged within a blower casing bolted or otherwise attached to either the compressor end 111 or the motor end 113 of the housing 110. Such an embodiment is described in co-pending U.S. Provisional Patent Application Ser. No. 61/407,059, filed on Oct. 27, 2010, the contents of which are hereby incorporated by reference to the extent consistent with the present disclosure.

The blower 128 may be a centrifugal impeller, but in other embodiments, the blower 128 may be an axial fan, or the like. The blower 128 may be configured to circulate a cooling gas through a cooling circuit 130 adapted to regulate the temperature of the motor 102 and bearings 120, 122. As will be described in more detail below, the cooling gas circulating throughout the cooling circuit 130 may be cooled by passing through a gas-to-gas heat exchanger 156 in fluid communication with the process gas for the compressor 104, such as the suction process gas 131.

In exemplary operation of the system 100, the motor 102 may be configured to rotate the shaft 108 and simultaneously drive the compressor 104, blower 128, and integrated separator 106 (if used). The incoming suction process gas 131 to be compressed may be introduced into the system 100 via a suction inlet 142. The process gas 131 may include, but is not limited to, a mixture of hydrocarbon gas, such as natural gas or methane derived from a production field or via a pressurized pipeline. In other embodiments, the process gas 131 may include air, $CO_2$, $N_2$, ethane, propane, $i-C_4$, $n-C_4$, $i-C_5$, $n-C_5$, and/or combinations thereof. The separator 106 may be configured to receive the suction process gas 131 via the suction inlet 142 and remove portions of high-density components therefrom, thereby generating a substantially dry process gas. It will be appreciated that in embodiments where the separator 106 is not used, the suction process gas 131 may be fed directly into the first compression stage or impeller 124 of the compressor 104. The compressor 104 may be configured to receive and compress the process gas through the successive stages of impellers 124 to thereby produce a compressed process gas 133 discharged from the compressor 104 via a process discharge 144.

The reliability and life of the motor 102 and magnetic bearings 120, 122 can be extended by using dry, clean cooling gas in the cooling circuit 130. To prevent "dirty" process gas from leaking into the cooling circuit 130 via the adjacent bearing assemblies 120, 122, the system 100 may employ one or more buffer seals 146. The buffer seals 146 may be radial seals arranged at or near each end of the driven section 114 of the shaft 108 and inboard of the bearings 120. In one or more embodiments, the buffer seals 146 may be brush seals or labyrinth seals. In other embodiments, however, the buffer seals 146 may be dry gas seals or carbon ring seals configured to receive a feed of pressurized seal gas via lines 148.

The seal gas provided via lines 148 may be a pressurized process gas derived from the discharge 144 of the compressor 104 and filtered for injection into the buffer seals 146. In other embodiments, however, especially in applications using dry gas seals, the seal gas in lines 148 may be a dry and clean hydrocarbon gas, hydrogen, or inert gas such as helium, nitrogen, or $CO_2$. During operation of the system 100, the injection of the seal gas via line 148 may be configured to create a pressure differential designed to prevent process gas leakage across the buffer seal 146 and into locations of the housing 110 where the bearings 120, 122 and the motor 102 are located.

The cooling gas circulated through the cooling circuit 130 may be the same gas as the seal gas in lines 148. In other embodiments, the cooling gas, the seal gas, and the process gas may all be the same gas or fluid, which may prove advantageous in maintaining and designing any auxiliary systems.

In order to cool or otherwise regulate the temperature of the motor 102 and the bearings 120, 122, the cooling gas is circulated throughout the housing 110 via the cooling circuit 130. As will be described in more detail below, the cooling circuit 130 may be characterized as a semi-closed loop system, since it is adapted to receive supplemental process gas via supplemental gas line 170 from an intermediate stage of the compressor 104. The cooling circuit 130 includes, among other conduits/lines to be described below, various internal cooling passages 150a, 150b, 152a, and 152b defined or otherwise formed within the housing 110. The cooling gas is circulated through the cooling circuit 130 using the blower 128, and eventually returned to the blower 128 to complete a loop.

The blower 128 may discharge the cooling gas via the blower outlet 140 into line 154. A valve 153 may either be disposed within the blower outlet 140 or within line 154 to regulate the head pressure of the discharged cooling gas. Appropriate control systems and pressure/temperature sensing equipment 155 may be coupled to the valve 153 to regulate its position and monitor the conditions in the cooling circuit 130. In yet other embodiments, the valve 153 may be entirely omitted from the system 100 and the cooling gas may instead be circulated at a pressure proportional to the combined rotation speed of the shaft 108 and the fluid resistance exhibited by the cooling circuit 130.

In one embodiment, the cooling gas in line 154 may be directed through a gas conditioning skid 157 configured to filter the cooling gas. This may prove advantageous where a portion of the process gas 131 is tapped from an intermediate stage of the compressor 104 via supplemental gas line 170, as illustrated. In one embodiment, the gas conditioning skid 157 may include a density-based separator, centrifugal separator, or a filter (not shown) configured to remove generated condensation.

The cooling gas may also be directed through a heat exchanger 156 adapted to reduce the temperature of the cooling gas and generate a cooled cooling gas in line 158. It will be appreciated that the gas conditioning skid 157 may be placed either upstream or downstream from the heat exchanger 156, without departing from the scope of the disclosure. In one embodiment, the heat exchanger 156 may be a gas-to-gas heat exchanger, such as a shell and tube heat exchanger, adapted to also receive a flow of the suction process gas 131 as a cooling medium for reducing the temperature of the cooling gas. In other embodiments, the heat exchanger 156 may be a plate/fin heat exchanger or a printed circuit heat exchanger, without departing from the scope of the disclosure.

An external gas conditioning skid 159 may also be included in the system 100 and configured to provide the seal gas for the buffer seals 146 via lines 148 during system 100 start-up and/or during normal operation. The external gas conditioning skid 159 may also provide initial fill gas via line 165 to provide pressurized cooling gas for the system 100 until an adequately pressurized source of process gas/cooling gas may be obtained. During normal operation, the fill gas in line 165 may also be used in the event there is a sudden change in pressure in the system 100 and pressure equilibrium between the compressor 104 and the motor 102 must be located in order to stabilize the cooling circuit 130.

The cooled and filtered cooling gas in line 158 may be subsequently separated into lines 160 and 162 before being injected into the internal cooling passages 150a,b and 152a,b, respectively. Specifically, the cooling gas in line 160 may be split and introduced into internal cooling passages 150a and 150b to cool the bearings 120 that support the driven section 114 of the shaft 108. As the cooling gas nears the bearings 120, the buffer seals 146 generally prevent the cooling gas from passing into the integrated separator 106 or compressor 104. Instead, the cooling gas may freely pass through the bearings 120 (i.e., through a gap (not shown) formed between each bearing 120 and the shaft 108) toward the opposing ends of the driven section 114 of the shaft 108. As the cooling gas passes through the bearings 120, heat is drawn away from the bearings 120 to cool or otherwise regulate the temperature of each bearing 120. There may be embodiments where at least a small portion of the seal gas in lines 148 provided to the buffer seals 146 may be combined with the cooling gas at each end of the driven section 114 of the shaft 108.

The cooling gas coursing through the internal cooling passage 150a may also be configured to cool the axial thrust bearing 122 as it channels toward the compressor end 111 of the housing 110 and ultimately discharged via line 164. Line 164 may further serve a dual purpose as a pressure equalizer adapted to reduce pressure thrusts from the compressor 104 by maintaining each end of the compressor 104 in pressure equilibrium. The cooling gas in internal cooling passage 150b may cool the bearings 120 adjacent the coupling 116 and in due course escape into the cavity 115. In one embodiment, the cavity 115 may also be configured to receive the cooling gas in line 164. Accordingly, the cooling gas channeled through both internal cooling passages 150a and 150b may be recombined within the cavity 115.

The cooling gas in line 162 may be split and introduced into the internal cooling passages 152a and 152b to cool the motor 102 and also the bearings 120 that provide support to the motor rotor section 112 of the shaft 108. The cooling gas may exit the internal cooling passages 152a,b through the bearings 120 (i.e., through the gap formed between each bearing 120 and the shaft 108) on each end of the motor rotor section 112, and simultaneously remove heat generated by the motor 102 and the bearings 120. On one side of the motor 102 (e.g., the left side as shown in FIG. 1), the cooling gas may be discharged through the bearing 120 and into the cavity 115 where it is combined with the cooling gas discharged from the internal cooling passages 150a,b. The cooling gas collected in the cavity 115 may then be discharged from the housing 110 via a return line 166 that is fluidly coupled to the blower 128 for delivering the spent cooling gas back to the blower 128 in order to commence the cooling circuit 130 over again. On the other side of the motor 102 (e.g., the right side as shown in FIG. 1), the cooling gas may traverse the bearing 120 and feed directly into the blower 128. Balance line 168 may be fluidly coupled to the return line 166 and be configured to counteract or otherwise equalize axial forces generated by the blower 128. It should be noted that the terms "left" and "right," or other directions and orientations, are described herein for clarity in reference to the Figures and are not to be limiting of the actual device or system or use of the device or system.

The cooling circuit 130 may be considered semi-closed since a portion of process gas may be tapped off from an intermediate section of the compressor 104 and fed into supplemental gas line 170. The extra process gas may be subsequently fed into the return line 166 preceding the blower 128, thereby supplementing at least a portion of the cooling gas in the cooling circuit 130. In one embodiment, the extra process gas makes up less than 1% of the cooling gas. As illustrated, the process gas may be tapped from either the first or second stages of impellers 124, but it will be appreciated that the process gas may be tapped from any of the compression stages. Valves 172a and 172b may be used to regulate how much, and from which stage, the process gas is tapped.

The cooling circuit 130 generally described herein may prove advantageous in subsea applications by reducing or otherwise eliminating the buildup of hydrates. Since the cooling gas is cooled in the heat exchanger 156 using a flow of process gas, such as the suction process gas 131, the heat exchanger operates at a temperature near or at the temperature of process gas 131. As a result, even when running at low loads or during shut down periods, the cooling circuit 130 is configured to prevent freezing conditions which would otherwise cause serious problems in the cooling circuit 130. When the motor-compressor unit is running at part load the typical heat rejection of the motor and bearings is substantially lower than during full load operation. In this case, especially when the preferred passive control system is used, the cooling loop gas temperature can approach the lowest (inlet) temperature of the cooling medium. For a seawater-cooled system, this could be cold enough to promote the deleterious formation of hydrates in the cooling loop. For long term out-of service situations, any motor cooling system will have a potential to drop down to ambient subsea conditions. As will be appreciated by those skilled in the art, the embodiments disclosed herein have an advantage over other cooling schemes in that it is thermally close-coupled to the main process gas piping which will typically have some type hydrate prevention methodology such as heat tracing and insulation.

Figure 2:
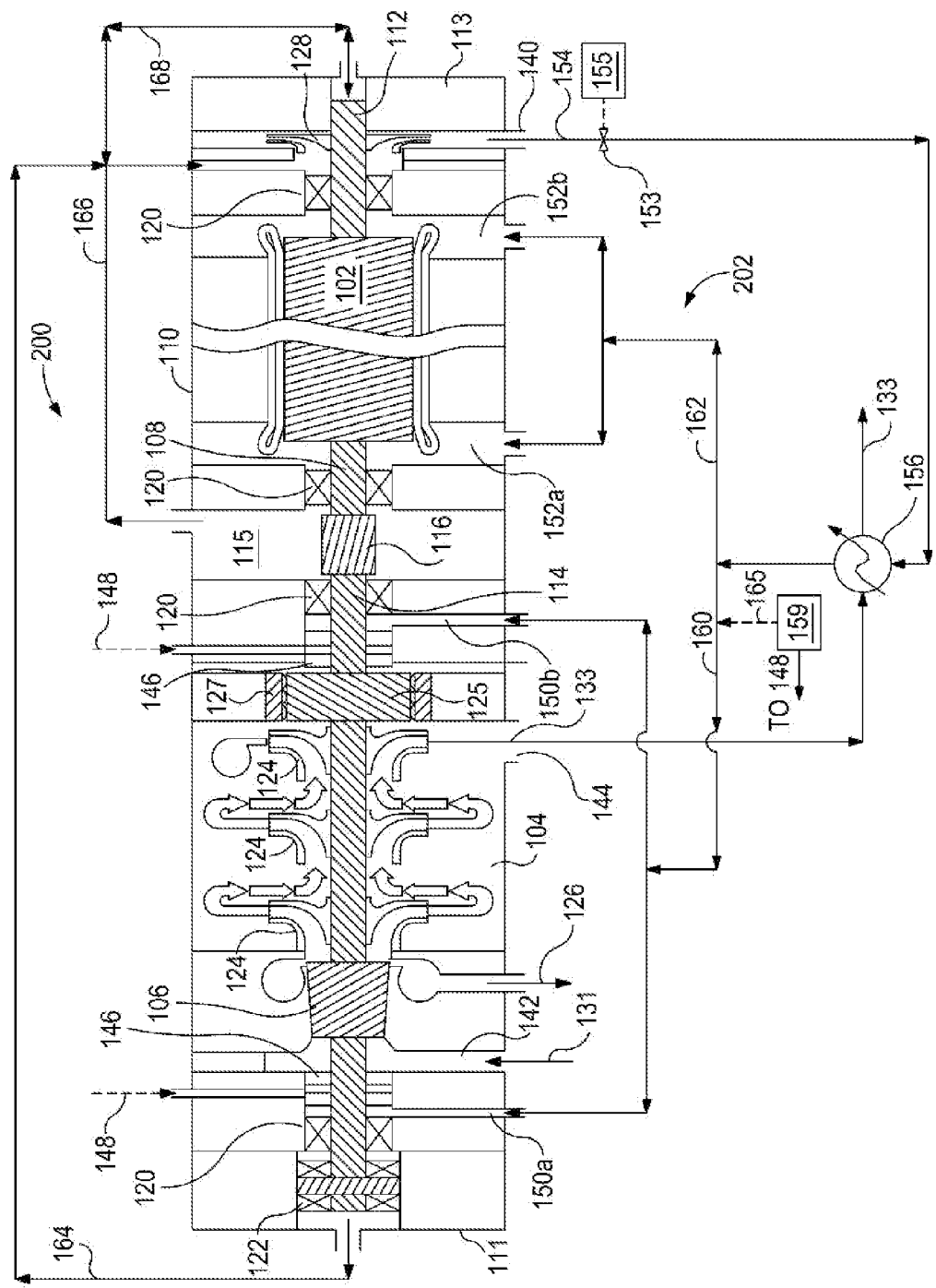
FIG. 2 illustrates another exemplary fluid compression system and cooling circuit, according to one or more embodiments disclosed.

Referring now to FIG. 2, depicted is another exemplary fluid compression system 200, similar to the fluid compression system 100 of FIG. 1. Accordingly, the system 200 may be best understood with reference to FIG. 1, where like numerals correspond to like components and therefore will not be described again in detail. Similar to the system 100 of FIG. 1, the system 200 may include a cooling circuit 202 configured to circulate a cooling gas in order to cool or otherwise regulate the temperature of the motor 102 and accompanying bearings 120, 122. Unlike the cooling circuit 130 of FIG. 1, however, the cooling circuit 202 of FIG. 2 may be considered as a closed-loop system since the cooling gas is not supplemented by tapping process gas from an intermediate stage of the compressor 104. Instead, the cooling circuit 202 may be configured to circulate a clean, filtered process gas including, but not limited to, $CO_2$, hydrogen, argon, nitrogen, or other fluids having suitable heat transfer characteristics and low density.

As illustrated, the heat exchanger 156 may be adapted to receive a flow of the compressed process gas 133 discharged from the compressor 104 in order to cool the cooling gas in the cooling circuit 202. It will be appreciated that the cooling gas may be cooled using either the suction process gas 131, as shown in FIG. 1, or the compressed process gas 133 in any of the embodiments disclosed herein. Whether the suction process gas 131 or the compressed process gas 133 is used as the cooling medium in the heat exchanger 156 will depend on the application and/or the operating temperature desired for the cooling gas.

The gas conditioning skid 157 of FIG. 1 may also be omitted from the cooling circuit 202, since process gas is not tapped from an intermediate stage to supplement the cooling circuit 202. However, the external gas conditioning skid 159 may be used to provide excess cooling gas to the cooling circuit 202 via line 165 when needed. The cooling circuit 202 may also redirect the cooling gas in line 164 directly to the return line 166 to be injected into the blower 128 to complete the loop. It will be appreciated, however, that line 164 can be routed to either the cavity 115 (as in FIG. 1) or directly to the return line 166 in any of the embodiments disclosed herein, without departing from the scope of the disclosure.

Figure 3:
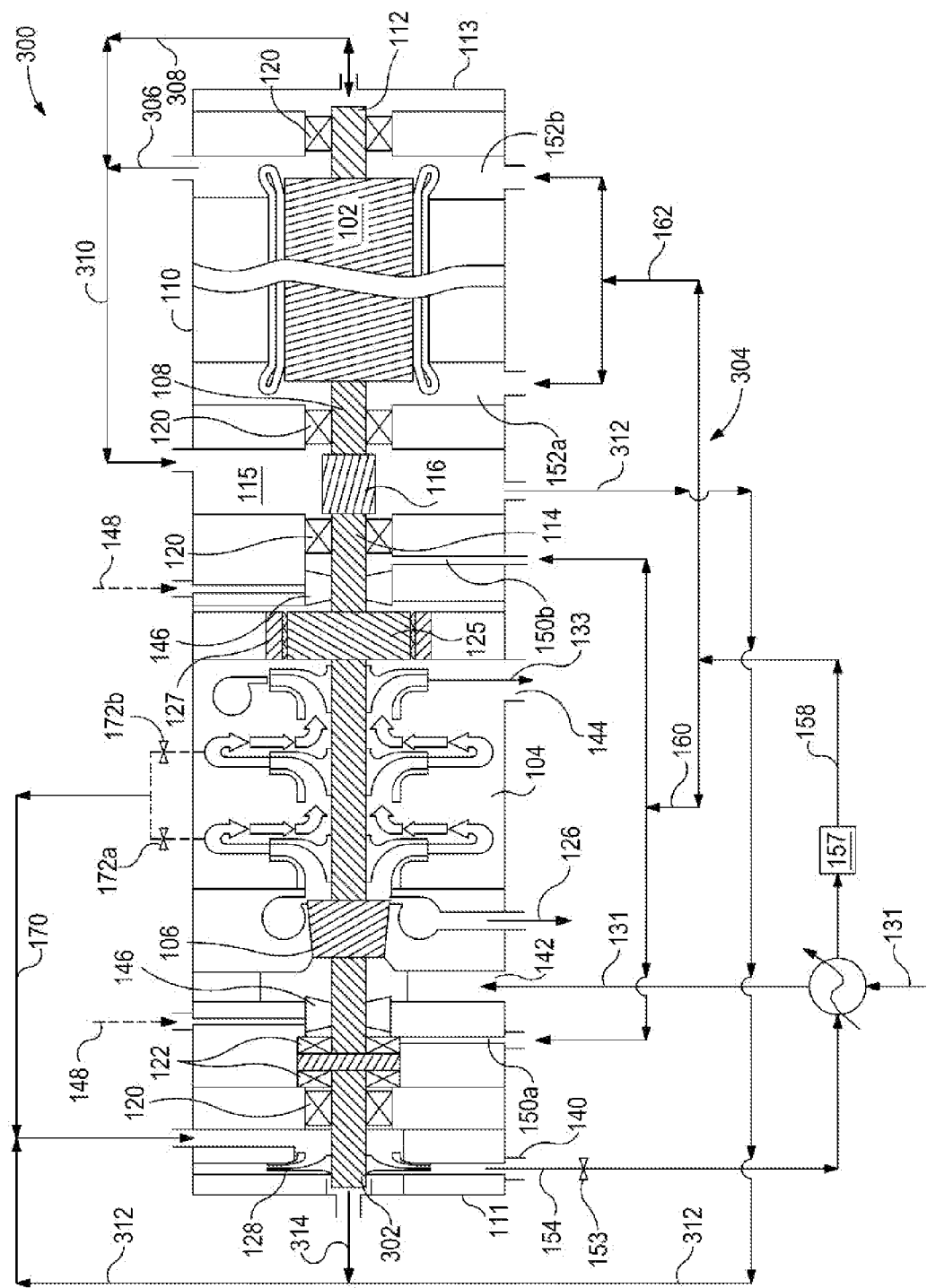
FIG. 3 illustrates another exemplary fluid compression system and cooling circuit, according to one or more embodiments disclosed.

Referring now to FIG. 3, depicted is another exemplary fluid compression system 300, similar in some respects to the fluid compression systems 100 and 200 described above with reference to FIGS. 1 and 2, respectively. Accordingly, the system 300 may be best understood with reference to FIGS. 1 and 2, where like numerals correspond to like components and therefore will not be described again in detail. Unlike systems 100 and 200, system 300 may have the blower 128 arranged within the hermetically-sealed housing 110 at or near the compressor end 111. In particular, the blower 128 may be coupled or otherwise attached at a free end 302 of the driven section 114 of the shaft 108. Placing the blower 128 on the free end 302 of the driven section 114 of the shaft 108, as opposed to the free end of the motor rotor section 112 as illustrated in FIGS. 1 and 2, may serve to increase flexibility on the selection of the particular motor 102 used.

The system 300 may employ a semi-closed loop cooling circuit 304 for cooling the motor 102 and accompanying bearings 120, 122. However, it will be appreciated that the system 300 may also suitably operate with a closed-loop cooling circuit, such as the cooling circuit 202 generally described above with reference to FIG. 2, without departing from the scope of the disclosure. As with previously-disclosed embodiments, the cooling circuit 304 may commence and terminate at the blower 128 which receives spent cooling gas and subsequently discharges the cooling gas into line 154. The valve 153 may regulate fluid flow or may optionally be omitted, as described above. The heat exchanger 156 may be in fluid communication with the suction process gas 131 and thereby cool the cooling gas as it passes therethrough. As indicated above, however, the heat exchanger 156 may equally be in fluid communication with the discharge process gas 133, without departing from the scope of the disclosure.

The cooled and filtered cooling gas in line 158 is split into lines 160 and 162 to be injected into internal cooling passages 150a,b and 152a,b, respectively. Cooling gas coursing through internal cooling passage 150a cools the bearings 120, 122 adjacent the compressor side 111 of the housing 110 and eventually returns to the blower 128. Cooling gas coursing through internal cooling passage 150b cools the bearings 120 adjacent the shaft coupling 116 and is eventually ejected into the cavity 115. Cooling gas in internal cooling passages 152a,b may cool the motor 102 and the bearings 120 on either side of the motor 102, and subsequently pass through the bearings 120 and either enter the cavity 115 on the left side of the motor 102 or escape via line 306 on the right side of the motor 102. A balance line 308 is fluidly coupled to the line 306 to regulate axial thrusts experienced at the motor end 113 of the housing 110. Line 306 and balance line 308 combine to form return line 310 which delivers spent cooling gas to the cavity 115. The spent cooling gas in the cavity 115 may then be recirculated to the blower 128 via a return line 312.

A balance line 314 may be fluidly coupled to the return line 312 and be configured to equalize axial forces generated by the blower 128. Moreover, process gas may be tapped off when needed from an intermediate section of the compressor 104 and fed into supplemental gas line 170, which is also in fluid communication with the return line 312. As with prior embodiments, valves 172a and 172b may be used to regulate how much process gas is tapped, if any, and from which stage of impellers 124 the process gas is taken.

In yet other embodiments, the blower 128 may be incorporated into the interconnecting coupling 116 adapted to couple the rotor portion 112 to the driven portion 114 of the shaft 108. Such an embodiment is also disclosed in co-pending U.S. provisional patent application Ser. No. 61/407,059 which was incorporated by reference above.

Figure 4:
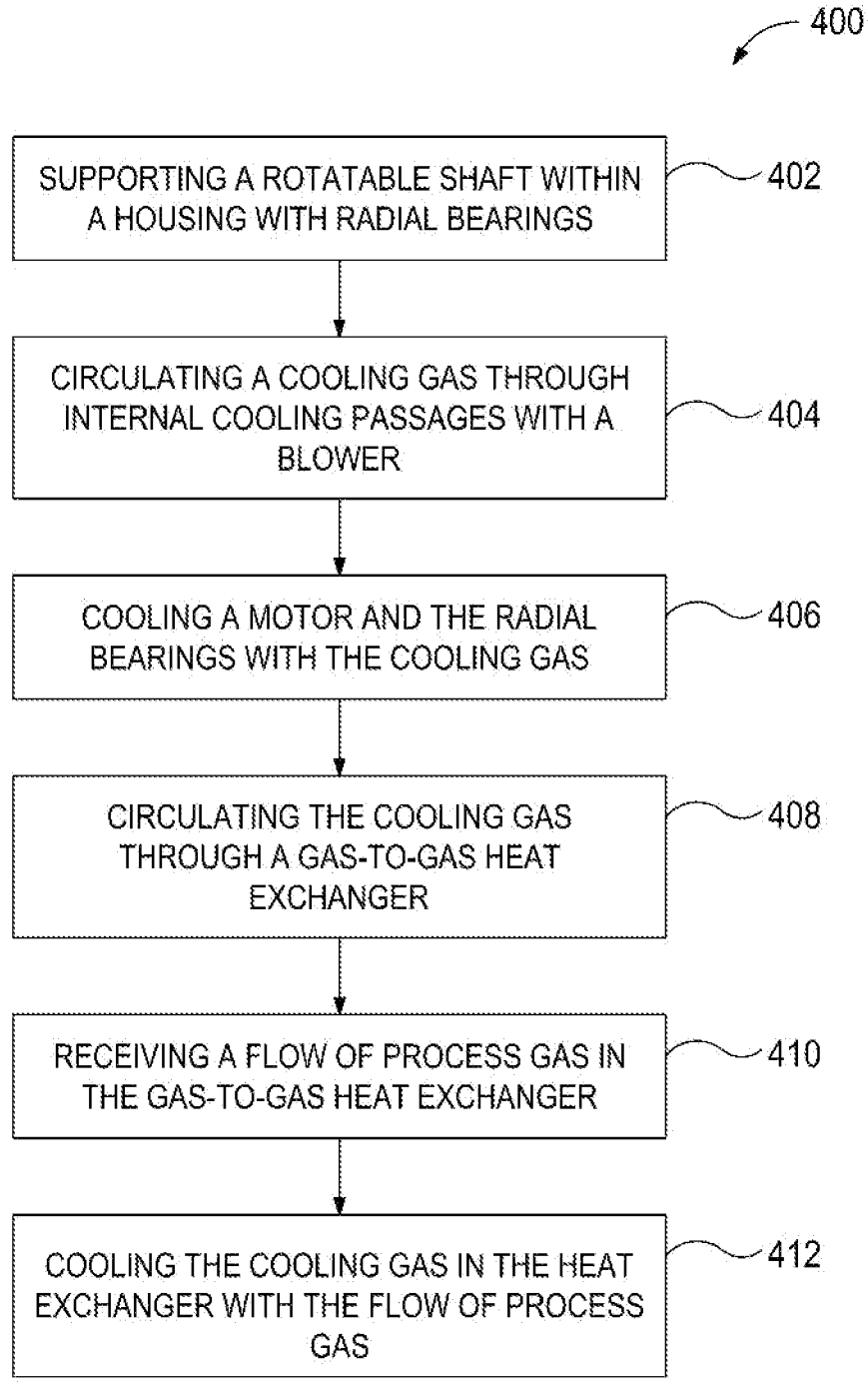
FIG. 4 illustrates a flowchart of a method of cooling a fluid compression system, according to one or more embodiments disclosed.

Referring now to FIG. 4, illustrated is a flowchart depicting a method 400 for cooling a fluid compression system. The method 400 may include supporting a rotatable shaft within a hermetically-sealed housing with one or more radial bearings, as at 402. The radial bearings may be in fluid communication with internal cooling passages defined within the housing. A cooling gas may be circulated through the internal cooling passages with a blower, as at 404. The blower may be coupled to a free end of the rotatable shaft. The method 400 may further include cooling a motor arranged within the housing and the radial bearings with the cooling gas, as at 406. The cooling gas may be circulated through a gas-to-gas heat exchanger, as at 408. The heat exchanger may be in fluid communication with the blower. The method 400 may also include receiving a flow of process gas in the gas-to-gas heat exchanger, as at 410. The cooling gas may be cooled in the gas-to-gas heat exchanger with the flow of process gas, as at 412.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A fluid compression system, comprising:
    a hermetically-sealed housing having a rotatable shaft arranged therein, the housing defining a plurality of internal cooling passages and the rotatable shaft having a motor rotor section and a driven section, wherein the motor rotor section is adapted to rotate the driven section;
    a motor arranged within the housing and comprising a stator and a rotor, the rotor of the motor coupled to or part of the motor rotor section of the rotatable shaft, and in fluid communication with at least one of the plurality of internal cooling passages;
    a compressor arranged within the housing and axially-spaced from the motor, the compressor being coupled to the driven section of the shaft and configured to receive and compress a process gas;
    one or more radial bearings arranged along the rotatable shaft and configured to support the motor rotor and driven sections, each radial bearing is in fluid communication with at least one of the plurality of internal cooling passages;
    a blower axially-spaced from the compressor and arranged within the housing and coupled to a free end of the rotatable shaft, the blower being configured to circulate a cooling gas through the plurality of internal cooling passages to regulate the temperature of the stator and the rotor of the motor and the one or more radial bearings;
    a valve fluidly coupled to an outlet of the blower and configured to regulate a pressure of the cooling gas discharged from the blower; and
    a gas-to-gas heat exchanger disposed downstream from the blower, the gas-to-gas heat exchanger being fluidly coupled to the blower and configured to receive the cooling gas from the blower and a flow of the process gas to reduce the temperature of the cooling gas, wherein the flow of the process gas is compressed process gas discharged from the compressor.

2. The fluid compression system of claim 1, further comprising an integrated separator arranged within the housing and axially-spaced from the compressor, the integrated separator being coupled to the driven section of the shaft and configured to rotate therewith.

3. The fluid compression system of claim 1, further comprising an axial thrust bearing arranged on the driven section of the shaft adjacent a compressor end of the housing.

4. The fluid compression system of claim 1, wherein the one or more radial bearings are magnetic bearings.

5. A cooling circuit for a motor-compressor, comprising:
    internal cooling passages defined within a hermetically-sealed housing having a rotatable shaft arranged therein, the rotatable shaft being supported by a plurality of radial bearings in fluid communication with at least one internal cooling passage;
    a blower axially-spaced from a compressor of the motor-compressor and in fluid communication with the internal cooling passages and arranged within the housing, the blower being coupled to the rotatable shaft for rotation therewith and configured to circulate a cooling gas through the plurality of internal cooling passages, thereby cooling a stator and a rotor of a motor of the motor-compressor;
    a valve fluidly coupled to an outlet of the blower and configured to regulate a pressure of the cooling gas discharged from the blower; and
    a gas-to-gas heat exchanger disposed downstream from the blower, the gas-to-gas heat exchanger being in fluid communication with the blower and configured to receive the cooling gas from the blower and a flow of process gas to reduce the temperature of the cooling gas, wherein the flow of the process gas is compressed process gas discharged from the compressor.

6. The cooling circuit of claim 5, further comprising a supplemental gas line fluidly coupled to the blower and also to an intermediate stage of the compressor arranged within the housing.

7. The cooling circuit of claim 6, further comprising a gas conditioning skid in fluid communication with the blower, the gas conditioning skid being configured to remove contaminants from the cooling gas.

8. A method for cooling a fluid compression system, comprising:
    supporting a rotatable shaft within a hermetically-sealed housing with radial bearings, the radial bearings being in fluid communication with internal cooling passages defined within the housing;
    circulating a cooling gas through the internal cooling passages with a blower coupled to a free end of the rotatable shaft and axially-spaced from a compressor;
    regulating a pressure of the cooling gas discharged from an outlet of the blower via a valve fluidly coupled to the outlet of the blower;
    cooling a rotor and a stator of a motor arranged within the housing and the radial bearings with the cooling gas;
    circulating the cooling gas from the blower to a gas-to-gas heat exchanger disposed downstream from and in fluid communication with the blower;
    receiving a flow of process gas in the gas-to-gas heat exchanger, wherein the flow of the process gas is compressed process gas discharged from the compressor; and
    cooling the cooling gas in the gas-to-gas heat exchanger with the flow of process gas.

9. The method of claim 8, further comprising:
    removing a portion of the process gas from an intermediate stage of the compressor arranged within the housing; and
    supplying the portion of the process gas to the blower to supplement the cooling gas.

10. The method of claim 9, further comprising conditioning the cooling gas with a gas conditioning skid in fluid communication with the blower.

11. The method of claim 8, further comprising cooling an axial thrust bearing with the cooling gas.

* * * * *